US011133521B2

(12) United States Patent
Platt et al.

(10) Patent No.: US 11,133,521 B2
(45) Date of Patent: Sep. 28, 2021

(54) BINDER AND SLURRY COMPOSITIONS AND SOLID STATE BATTERIES MADE THEREWITH (71) Applicant: Solid Power, Inc., Louisville, CO (US)

(72) Inventors: Heather A. S. Platt, Golden, CO (US); Brandon Kelly, Longmont, CO (US); Joshua Buettner-Garrett, Littleton, CO (US)

(73) Assignee: Solid Power, Inc., Louisville, CO (US)

( * ) Notice: Subject to any disclaimer, the term of this patent is extended or adjusted under 35 U.S.C. 154(b) by 177 days.

(21) Appl. No.: 15/565,370

(22) PCT Filed: Apr. 8, 2016

(86) PCT No.: PCT/US2016/026661
§ 371 (c)(1),
(2) Date: Oct. 9, 2017

(87) PCT Pub. No.: WO2016/164737
PCT Pub. Date: Oct. 13, 2016

(65) Prior Publication Data
US 2018/0083303 A1 Mar. 22, 2018

Related U.S. Application Data (60) Provisional application No. 62/144,616, filed on Apr. 8, 2015.

(51) Int. Cl.
*H01M 10/04* (2006.01)
*H01M 4/13* (2010.01)
(Continued)

(52) U.S. Cl.
CPC ........ *H01M 10/0431* (2013.01); *C08G 75/14* (2013.01); *H01M 4/13* (2013.01);
(Continued)

(58) Field of Classification Search
CPC ......... H01M 10/0431; H01M 10/0583; H01M 10/0525; H01M 4/622; H01M 4/13;
(Continued)

(56) References Cited

U.S. PATENT DOCUMENTS 6,017,651 A  1/2000 Nimon
6,040,085 A  3/2000 Cheu et al.
(Continued)

FOREIGN PATENT DOCUMENTS

WO  WO 2014/159279  10/2014
WO  WO 2015/030053 A1  3/2015

OTHER PUBLICATIONS

International Search Report of PCT/US2016/026661 dated Aug. 5, 2016, 3 pp.
(Continued)

*Primary Examiner* — Gary D Harris
(74) *Attorney, Agent, or Firm* — Lathrop GPM LLP; Laura A. Labeots (57) ABSTRACT

Described herein are various embodiments of binder and slurry compositions and methods of making a solid-state battery therefrom. An solid-state electrochemical cell may include a first electrode substrate with a separator layer that is continuously interleaved in an alternating pattern with a second electrode substrate. A method of making a solid-state electrochemical cell may include applying a separator layer to a first electrode substrate and continuously interleaving folded portions of the first electrode substrate with alternating folded portions of a second electrode substrate to form an electrochemical cell.

17 Claims, 9 Drawing Sheets (51) Int. Cl.
  *H01M 4/62* (2006.01)
  *H01M 10/0525* (2010.01)
  *H01M 10/0583* (2010.01)
  *C08G 75/14* (2006.01)

(52) U.S. Cl.
  CPC ....... *H01M 4/622* (2013.01); *H01M 10/0525* (2013.01); *H01M 10/0583* (2013.01)

(58) Field of Classification Search
  CPC .... H01M 4/621; H01M 10/0562; H01M 2/14; H01M 2300/0065; H01M 10/052; C08G 75/14
  USPC .......................................................... 429/94
  See application file for complete search history.

(56) References Cited

U.S. PATENT DOCUMENTS

| | | | |
|---|---|---|---|
| 6,680,141 B2 | 1/2004 | Hikmet et al. | |
| 7,049,028 B2 | 5/2006 | Notten et al. | |
| 7,794,873 B2 | 9/2010 | Mino et al. | |
| 2009/0291366 A1* | 11/2009 | Stevanovic | H01M 4/1397 423/561.1 |
| 2013/0323603 A1* | 12/2013 | Ryu | H01M 4/80 429/320 |
| 2014/0217992 A1 | 8/2014 | Li et al. | |
| 2014/0272537 A1 | 9/2014 | Kretschmar et al. | |
| 2014/0272559 A1 | 9/2014 | Kretschmar et al. | |
| 2015/0056507 A1* | 2/2015 | Dadheech | H01M 4/13 429/218.1 |

OTHER PUBLICATIONS

Nagao et al. (2012) "High-capacity Li2S-nanocarbon composite electrode for all-solid-state rechargeable lithium batteries," Journal of Materials Chemistry, vol. 22, No. 19, 6 pp.
European Patent Application No. 16777365.4, Extended Search and Opinion dated Oct. 30, 2018, 8 pages.
Yamin et al. (1983) "Electrochemistry of a nonaqueous lithium/sulfur cell", Journal of Power SOU, Elsevier SA, CH, vol. 9, pp. 281-287.
European Patent Application No. 16777365.4, Communication pursuant to Article 94(3) EPC dated May 18, 2020, 4 pages.
Chinese Patent Application No. 201680020888.2, Office Action dated Mar. 31, 2020, 10 pages.
Chinese Patent Application No. 201680020888.2, English translation of Office Action dated Nov. 12, 2020, 16 pages.
CN Application No. 201680020888.2 Office Action dated Apr. 20, 2021, 10 pages.
EP Application No. 16777365.4, Office Action dated Jun. 1, 2021, 4 pages.
Nagao, High-capacity Li2S-nanocarbon composite electrode for all-solid-state rechargeable lithium batteries, Journal of Materials Chemistry, Jan. 1, 2012, Royal Society of Chemistry, vol. 22, Nr.:19, p. 10015 https://dx.doi.org/10.1039/c2jm16802b.

* cited by examiner

BINDER AND SLURRY COMPOSITIONS AND SOLID STATE BATTERIES MADE THEREWITH

RELATED APPLICATIONS

This application claims benefit of priority to U.S. provisional application Ser. No. 62/144,616, filed Apr. 8, 2015, which is incorporated herein by reference.

GOVERNMENT RIGHTS

This invention was made with government support under contract number H92222-14-P-0030, SOCOM Phase I SBIR, awarded by the Department of Defense. The government has certain rights in the invention.

FIELD

Various embodiments described herein relate to the field of primary and secondary electrochemical cells, electrodes and electrode materials, binder and slurry compositions and corresponding methods of making and using same.

SUMMARY

In an embodiment, a solid-state electrochemical cell is provided. The electrochemical cell includes a first electrode substrate with a separator layer, and a second electrode substrate continuously interleaved in an alternating pattern with the first electrode substrate to form an electrochemical cell.

In another embodiment, a method of making a solid-state electrochemical cell is provided. The method includes applying a separator layer to a first electrode substrate, and continuously interleaving folded portions of the first electrode substrate with alternating folded portions of a second electrode substrate to form an electrochemical cell.

In yet another embodiment, a solid-state electrochemical cell is provided. The electrochemical cell includes a first electrode substrate coated with a first lithium polysulfide based binder composition to form at least one of an anode, a cathode and a separator; a second electrode substrate coated with a second lithium polysulfide based binder composition; and, a continuously interleaved stack of the first electrode with the second electrode to form an electrochemical cell having alternating first and second electrode layers.

In yet another embodiment, a method of making a solid-state electrochemical cell is provided. The method includes modifying a lithium polysulfide based binder to provide at least one of an anode, a cathode and a separator; applying the modified lithium polysulfide binder to a first electrode substrate; drying the modified lithium polysulfide binder; and, forming an electrochemical cell by folding in a z-shaped pattern the first electrode substrate and continuously interleaving the first electrode substrate with a second electrode substrate folded in a z-shaped pattern.

Further embodiments are disclosed herein or will become apparent to those skilled in the art after having read and understood the specification and drawings hereof.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION OF ILLUSTRATED EMBODIMENTS

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well-known methods, processes, devices, and systems finding application in the various embodiments described herein are not disclosed in detail.

Advancements in solid-state batteries provide increases in safety, packaging efficiency, and enable new high-energy chemistries. Solid-state electrode and electrolyte layers have traditionally been processed using thin film deposition techniques (chemical vapor deposition ("CVD"), sputtering, thermal evaporation, etc.), powder pelletization, and/or tape casting. Any of these mentioned processes may be combined with high-temperature sintering. Coating processing methods used for Li-ion electrodes are scalable and low-cost, but one issue preventing transition of these existing technologies to solid-state electrochemical cells is compatible binders, slurries and solvents for processing the required layers. Promising lithium-sulfur-phosphorus ("Li—S—P") electrolyte materials for solid-state electrochemical cells are not compatible with many conventional solvents, but conventional binders rely on such solvents whereby inhibiting utility of cost-effective coating processes in advanced Li—S—P solid-state electrochemical cells The present invention includes lithium polysulfide ($Li_xS_y$) binder compositions which are compatible with suitable solvents and Li—S—P electrolyte materials thereby supporting integration of existing coating processes and current solid-state electrochemical cell materials and compositions.

Most significantly the binder compositions of the current invention improve the adhesion of solid-state glass or ceramic particle layers used within electrochemical cells. An exemplary binder composition may be a lithium polysulfide associated with one or more of the various solvents described herein (e.g., $Li_xS_y*zTHF$, $Li_2S_{10}*2THF$ or $Li_2S_{10}*6THF$ where THF is tetrahydrofuran). A binder composition, such as disclosed herein, allows slurries formed from a binder with the addition of electrolyte or electrode materials, or the precursors for each material of a solid-state electrochemical cell, to be coated and dried into layers with excellent interlayer and intralayer adhesion. Intralayer adhesion including particle-to-particle adhesion within any layer, and interlayer adhesion including layer-to-layer or layer-to-substrate adhesion. A binder composition of the present invention may be used in solid-state lithium electrochemical cells in any or all of the layers that form the cathode (positive electrode), the anode (negative electrode), and/or the separator of the solid-state electrochemical cell. The binder and associated slurry compositions allow the layers of the solid-state electrochemical cell to be coated using low-cost and scalable methods, for example, using conventional wet tape casting and coating methods.

Although described herein as applied to lithium based electrochemical cells, it is readily apparent that the sodium polysulfide analog ($Na_xS_y$) is also possible and offers potential cost advantages as well as compatibility with sodium battery materials. In other applications polyselenide compositions may substitute the polysulfide compositions. Additionally, the binders described herein may be used in non-lithium electrochemical cells, sulfide membrane applications, solid-state electrochemical capacitors and in liquid electrolyte batteries where the binder composition is not soluble in the electrolyte (e.g. ionic liquids).

Current solid-state electrode and separator coatings are performance limited because existing binders are not appropriate or compatible with solvents within the coating slurries. A significant improvement of the present invention is that the described polysulfide binders impart improved processibility and compatibility with solid sulfide materials in batteries as compared to conventional polymer binders such as polyvinylidene fluoride ("PVDF"), polytetrafluoroethylene ("PTFE"), polyolefins, etc. which are typically used for battery elements in liquid electrolyte and solid-state batteries. Examples of these applications may be seen in PCT application WO2013179120A1 by Hasegawa, et al. and is included herein by reference. Although polysulfides are noted for use as electrochemically active materials such as cathodes in lithium polymer batteries, for example, see U.S. Pat. No. 6,017,651, included herein by reference; these compounds are not described as binders in solid-state lithium batteries. Specifically, for example, U.S. Pat. No. 6,017,651 furthermore teaches the use of conventional binders with polysulfide active materials. Similarly, U.S. Pat. No. 6,569,573, included herein by reference, mentions polysulfides in lithium batteries but again critically not as binders. Additionally, U.S. Pat. No. 6,569,573 also teaches the use of conventional binders stating: "Examples of useful binders include, but are not limited to, those selected from the group consisting of polytetrafluoroethylenes (Teflon®), polyvinylidene fluorides (PVF2 or PVDF), ethylene-propylene-diene (EPDM) rubbers, polyethylene oxides (PEO), UV curable acrylates, UV curable methacrylates, and heat curable divinyl ethers, and the like. The amount of binder, if present, is preferably in the range of 2 to 30% by weight." In a further example, in U.S. Patent Application 2012/0135318, included herein by reference, lithium polysulfide is used as an electrochemical cathode additive to compensate for the cell's irreversible capacity loss. Again, this application calls for the use of conventional binders for electrode coatings.

The binder compositions of the present invention are compatible with electrolyte-friendly solvents while achieving adequate adhesion, conductivity, and electrochemical performance in solid-state cells. Specifically, the binder compositions are stable in aprotic solvents that are also suitable for sulfide electrolyte materials.

Figure 1:
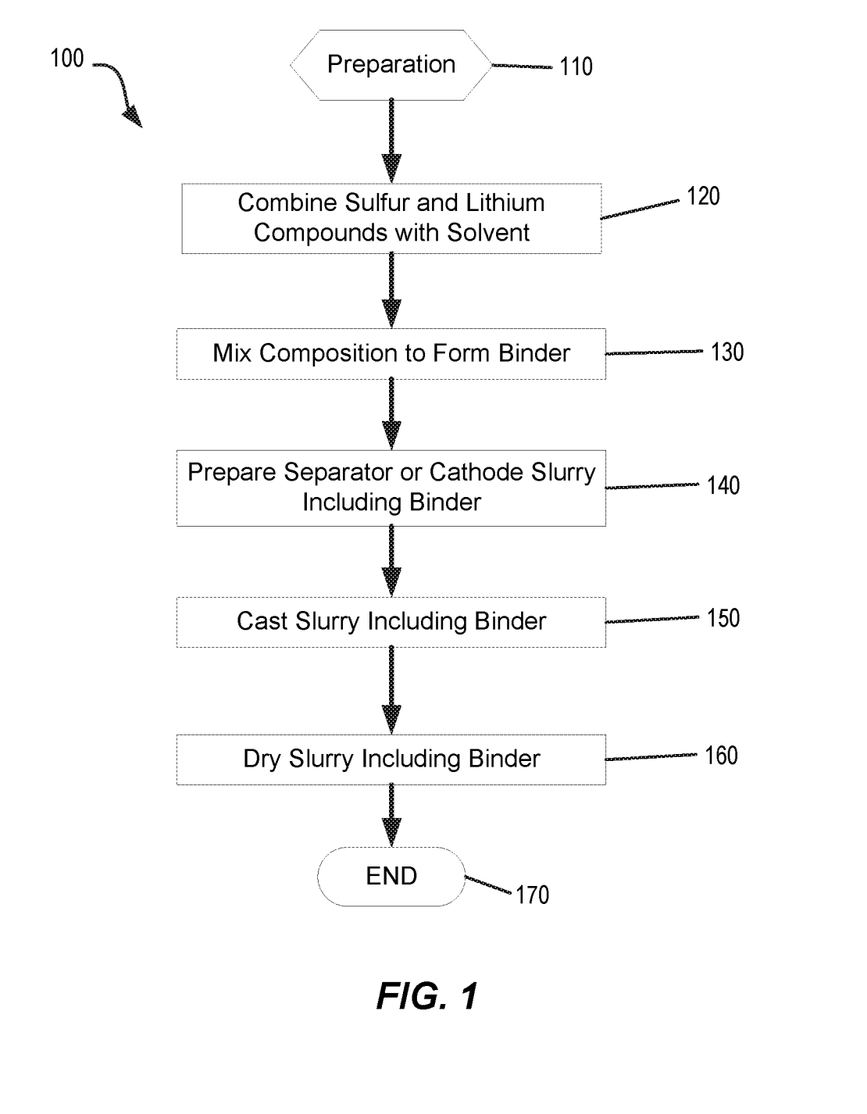
FIG. 1 is a flow chart of a process for making a polysulfide binder for sulfide ceramics useful for the construction of electrochemical cells, in accordance with an embodiment.

FIG. 1 is a flow chart of process 100 for making lithium polysulfide binders and/or slurries for sulfide glasses and ceramics useful for the construction of secondary electrochemical cells. Details of processing and adaptation of lithium polysulfide for the novel use of these compositions as binders and/or slurries are further detailed below.

Process 100 begins with preparation step 110 wherein any preparation action such as precursor synthesis, purification, and substrate surface treatments may take place. After any initial preparation, process 100 advances to step 120 wherein sulfur and lithium compounds may be combined with an appropriate solvent. Exemplary sulfur compounds may include, for example, elemental sulfur powder. Exemplary lithium compounds may include, for example, lithium metal (Li), lithium sulfide ($Li_2S$) and/or lithium nitride ($Li_3N$) typically in powder forms. Exemplary solvents may include, for example, but are not limited to, tetrahydrofuran ("THF"), dimethyl sulfoxide, γ-butyrolactone, dimethylacetamide, dimethylformamide, dimethyl sulfite, dimethyl sulfoxide, methyl acetate, methyl formate, nitromethane, propylene carbonate, chloro-pentafluoro benzene, methyl THF, thiophene, dimethyl carbonate, pyridine, and sulfolane. Multiple solvents may be mixed together with the noted lithium and sulfur compounds. Additional materials, such as co-solvents or polymers, may also be added during this step. For example, a co-solvent may be added to the binder composition to control drying characteristics of a resultant binder composition. The binder composition may also be modified or blended with a second polymer, such as polyvinyl chloride, polyanilene, poly(methyl methacrylate) ("PMMA"), nitrile butadiene rubber ("NBR"), PVDF, or polystyrene, to increase or decrease the elastic modulus and processibility of a coated layer formed from a slurry incorporating the binder composition. Next, in step 130 the binder composition may be mixed for a predetermined period of time and temperature. For example, the binder composition may be mixed and heated for several hours at temperatures from 20 to 60 degrees Celsius to sufficiently homogenize the binder composition. Alternatively, to steps 120 and 130 the solid lithium and sulfur compounds may be mixed together before a solvent is added. Subsequently, the composition of solid compounds and solvent may be then stirred, agitated or otherwise mixed until the solids dissolve. Regardless of the order of mixing, the solids in the mixture may completely dissolve, or it is also possible to prepare a lithium polysulfide binder composition by partially dissolving the solid portion of the composition. Next, in step 140, this binder composition may be combined directly with ceramic or glassy sulfide powders and other materials, such as electrode materials, non-sulfide electrolytes, and additional solvents, to form slurry compositions useful for the formation of solid-state electrochemical cell components. These slurry compositions may be, for example, cast, in step 150, as films using methods such as, but not limited to, doctor blade, roll coating, screen printing, inkjet printing, aerosol printing, or slot die coating. Following coating a slurry composition may be heated or allowed to air dry, in step 160. During a final step 170, completed coated components and/or cells may be evaluated for performance or packaged.

Alternatively to various steps of process 100, solid lithium and/or sulfur compounds may be introduced into a solution or solvent to form the lithium polysulfide binder composition by a potentiostatic electrochemical process. The solid lithium and sulfur compounds may form one or more of the electrodes, or other materials such as carbon or platinum may be used as a working electrode in the solution. Furthermore, the binder composition may be prepared and then heated to remove any preparation solvent. The dried binder composition may then be added to a solvent and ceramic or glassy powder in step 140 to perform the same function as the fully or partially dissolved binder composition. Other binder composition synthesis processes may be possible.

Figure 2:
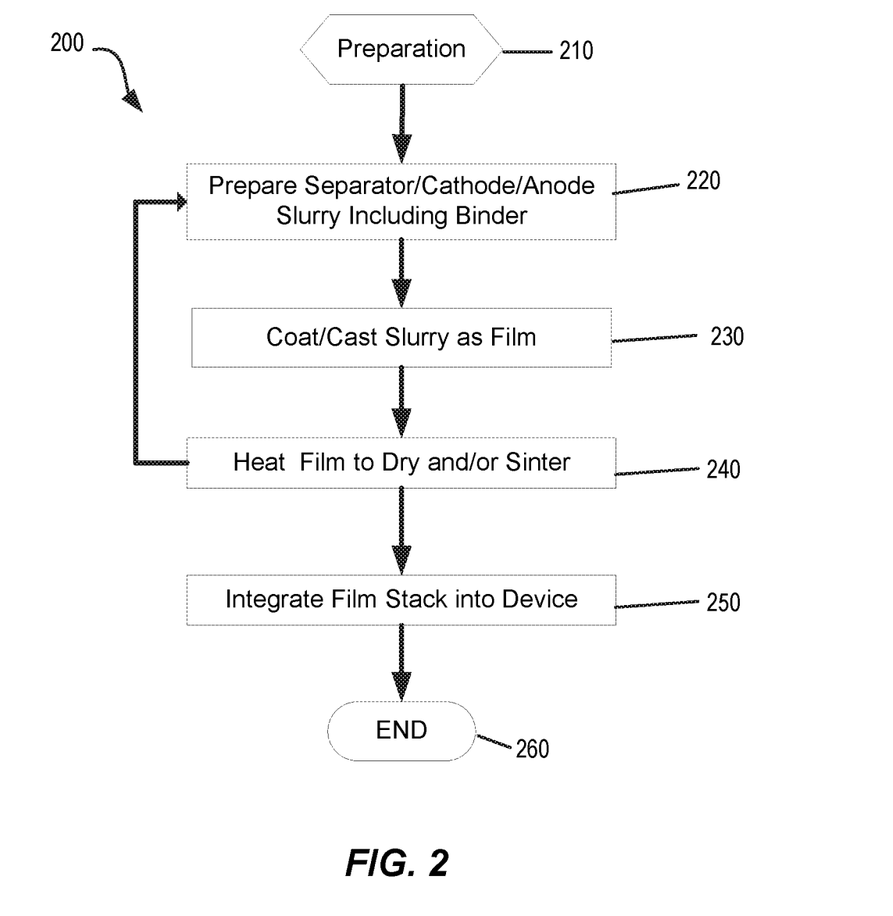
FIG. 2 is a flow chart of a process for using a polysulfide binder for sulfide ceramics in the construction of electrochemical cells, in accordance with an embodiment.

Further details of the formation of solid-state battery components may be understood by review of FIG. 2 which is a flow chart of process 200 for using a polysulfide slurry composition derived from a binder composition as described in process 100 for sulfide glasses and ceramics in the construction of secondary solid-state electrochemical cells. Process 200 begins with preparation step 210 wherein any preparation action such as selection of any required substrate and/or steps described in association with process 100 of FIG. 1 may take place. After any initial preparation, process 200 advances to step 220 wherein the binder-modified slurry composition for a layers, such as, separators, anodes, and/or cathodes may be prepared. It should be noted that an appropriately composed binder may be used to cast all of the various types of required layers by the addition of appropriate materials into the binder composition whereby forming a required slurry composition. For example, for an ionically and electronically conductive film, the slurry composition may include a ceramic or glassy powder mixture such as a metal oxide, metal phosphate, elemental sulfur, or metal sulfide that is electrochemically active. The slurry composition may also include carbon-containing solids such as, but not limited to, graphite and carbon black.

Following preparation of any required slurry compositions, each slurry composition may be coated or casted as a film on the appropriate substrate such as described in association with FIGS. 3A-D below during step 230. A slurry may be applied directly to a substrate or may be coated onto a carrier and then laminated to a substrate. Next in step 240, a film may be heated and/or sintered to densify and/or solidify the film for the layer currently cast. Process 200 may then return to step 220 or step 230 for further slurry preparation and/or film casting as many times as necessary to produce the desired layer stack. See FIGS. 3A-3D for example film stacks. After all desired film layers are formed, process 200 advances to step 250 wherein the stacked layers may be integrated into a solid-state battery. During a final step 260, completed components and/or cells may be evaluated for performance or packaged.

FIGS. 3A-3D are a set of cross-sectional views of stacked layers of portions of exemplary electrochemical cells produced using the processes defined in FIGS. 1 and 2. In each configuration of stacked layers, a suitable substrate (current collector 325 of FIG. 3A, aluminum layer 340 of FIG. 3B, copper layer 355 of FIG. 3C and lithium layer 365 of FIG. 3D) is provided upon which to form the layers. One or more layers may be formed upon the substrate layer. Although not shown, layers may be formed upon both sides of a substrate as well as overcoating any edges of the substrate and/or previously deposited layers. It should also be understood that known techniques for additive or subtractive patterning of any single layer or of multiple layers may also be utilized along with the coating processes.

Figure 3A:
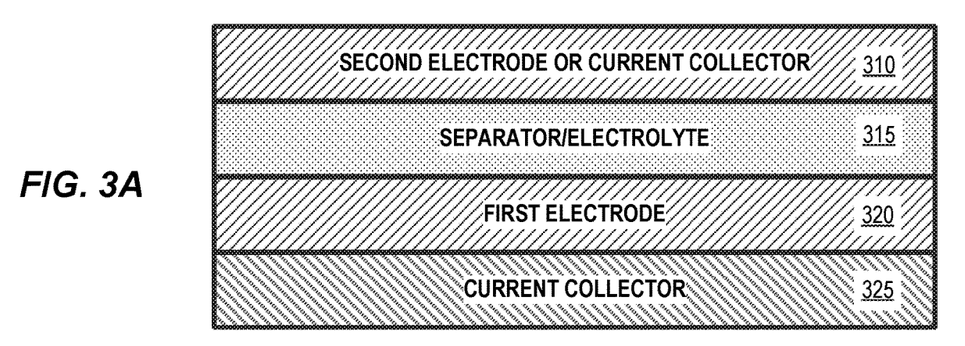
FIGS. 3A-3D are a set of cross-sectional views of stacked layers of exemplary electrochemical cells produced using the processes defined in FIGS. 1 and 2, in accordance with an embodiment.

For the structure of FIG. 3A, a slurry composition containing a mixture of the binder composition and electrode particles may be coated onto current collector 325, dried, and optionally densified to form first electrode layer 320. A separator slurry composition containing a mixture of the binder composition and electrolyte particles may then be coated onto the layer 320, dried, and again optionally densified to form separator/electrolyte layer 315. A second electrode/current collector 310 may be placed against separator/electrolyte layer 315. The structure of FIG. 3A forms an essentially complete electrochemical cell.

Figure 3B:
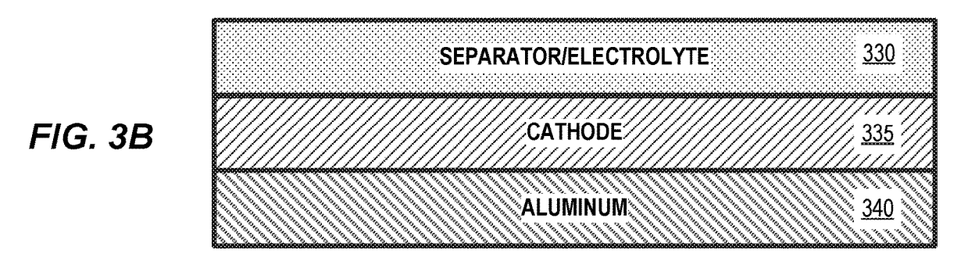

For the structure of FIG. 3B, a slurry composition containing a mixture of the binder composition and cathode electrode particles may be coated onto aluminum substrate 340, dried, and optionally densified to form cathode 335. A separator slurry composition containing a mixture of the binder composition and electrolyte particles may then be coated onto the layer 335, dried, and again optionally densified to form separator/electrolyte layer 330. The structure of FIG. 3B forms the cathode portion of an electrochemical cell.

Figure 3C:
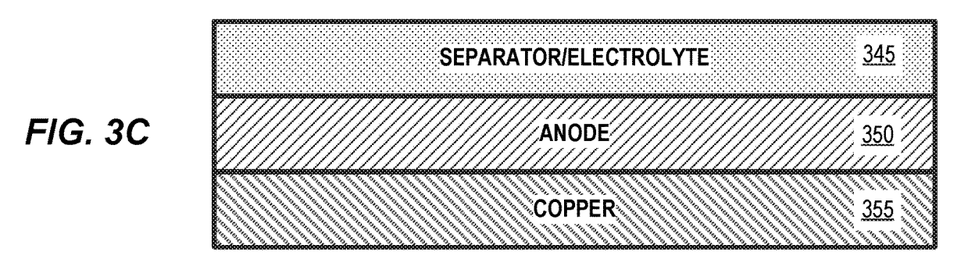

For the structure of FIG. 3C, a slurry composition containing a mixture of the binder composition and anode electrode particles may be coated onto copper substrate 355, dried, and optionally densified to form anode 350. A separator slurry composition containing a mixture of the binder composition and electrolyte particles may then be coated onto the layer 350, dried, and again optionally densified to form separator/electrolyte layer 345. The structure of FIG. 3C forms the anode portion of an electrochemical cell.

Figure 3D:
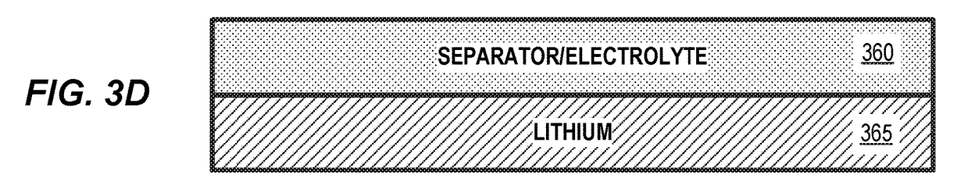

For the structure of FIG. 3D, a separator slurry composition containing a mixture of the binder composition and electrolyte particles may be coated onto lithium foil 365, dried, and again optionally densified to form separator/electrolyte layer 360. The structure of FIG. 3D forms the anode portion of an electrochemical cell.

Figure 4:
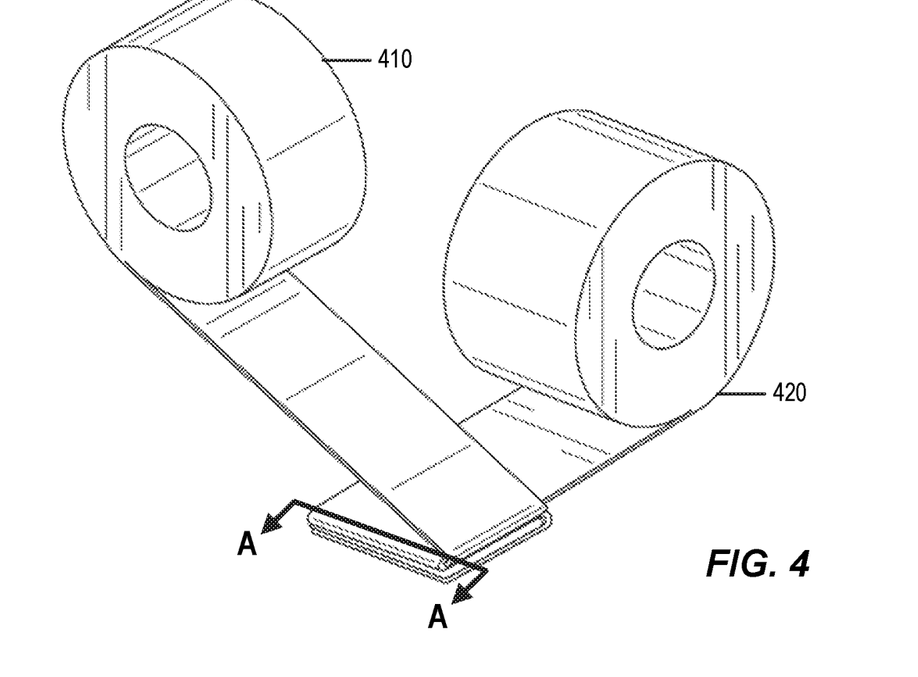
FIG. 4 is an illustration of a process for making an electrochemical cell using double z-folded strips incorporating the polysulfide binders described herein, in accordance with an embodiment.

FIG. 4 is an illustration of a process for making a secondary electrochemical cell via continuously interleaving by z-folding two discrete continuous long thin strips of material each over one another in alternating pattern utilizing the binder and slurry compositions of the present invention. In one embodiment, material strips 410 and 420 may be a double-side coated electrode structure and a lithium foil, respectively, as shown and described in association with FIG. 5. Alternatively, material strips 410 and 420 may be single-sided strips such as shown and described in association with FIGS. 3A-3D. In another embodiment, the continuously interleaved alternating pattern includes a material strip forming one electrode substrate folded in a z-shape that overlaps with alternating folds of a second electrode substrate, also folded in the z-shape. The alternating material strips may be oriented orthogonally with one another as shown in FIG. 4, for example.

By forming an electrochemical cell from continuous material strips, the resulting cell is an interleaved electrochemical cell with integrated electrode connections that is simple to form, integrate and package. Although shown and described herein with a rectangular layered form, a resultant electrochemical cell may be formed in a wide variety of form factors and shapes. Rectangular shapes may be simplest to produce, however many shapes are possible as long as these shapes can be formed from the material strips either prior to continuously interleaving or after. For example, an L-shaped cell may be formed by constructing a rectangular cell and then removing a corner of the cell. Similarly, a cell with a central aperture may be formed by removing a cylindrical portion from the interleaved rectangular cell structure.

Figure 5:
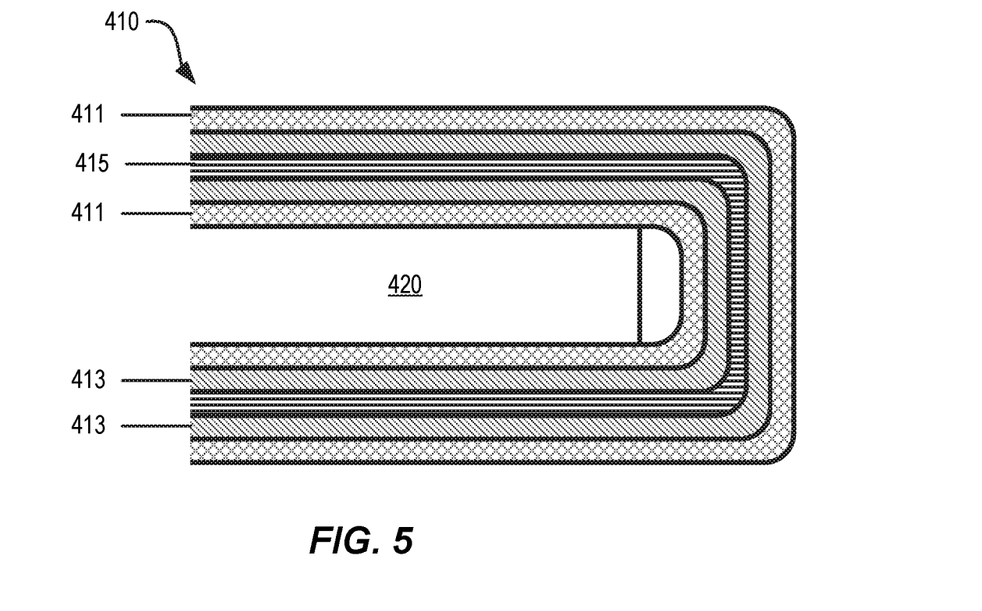
FIG. 5 is a cross-sectional view of a portion of an exemplary electrochemical cell produced using the processes defined in FIGS. 1, 2 and 4, in accordance with an embodiment.

A simplified cross-sectional view of a portion of the resultant electrochemical cell produced using the processes defined in FIGS. 1, 2, 3 and 4 is shown in FIG. 5 for a cross-section projected from line A-A of FIG. 4. The electrochemical cell may be advantageously formed utilizing the improved binder compositions, slurry compositions and coating processes and materials described herein above. Material strip 410, for example when used as a cathode, may be a double-side coated electrode form of separator layers 411 and cathode layers 413 coated or laminated upon both surfaces of aluminum substrate 415 which acts as a current collector. Material strip 410 may be, for example, 315 cm long by 14.3 cm wide and 150 microns thick. Material strip 420 in this example may simply be a lithium metal foil with dimensions, for example, 485 cm long by 9.2 cm wide and 35 microns thick. Other material strip dimensions may be used as appropriate to the cell to be constructed.

Figure 6:
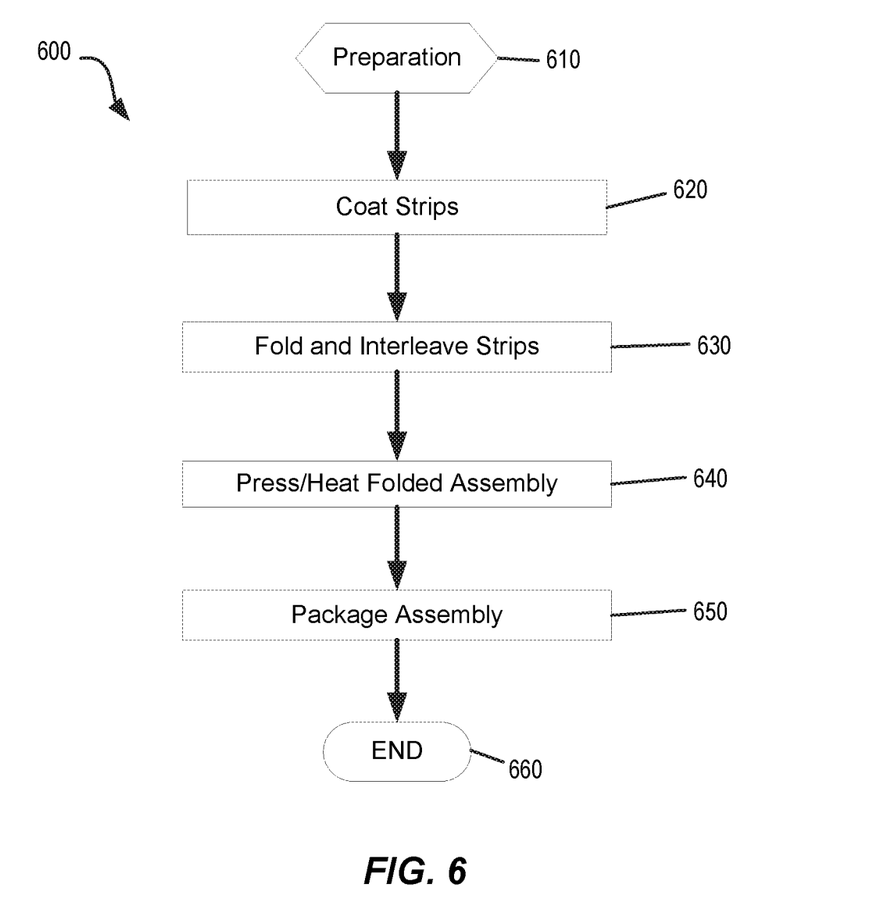
FIG. 6 is a flow chart of a process for making electrochemical cells, such as shown in FIGS. 7A-7D, in accordance with an embodiment.
Figure 7A:
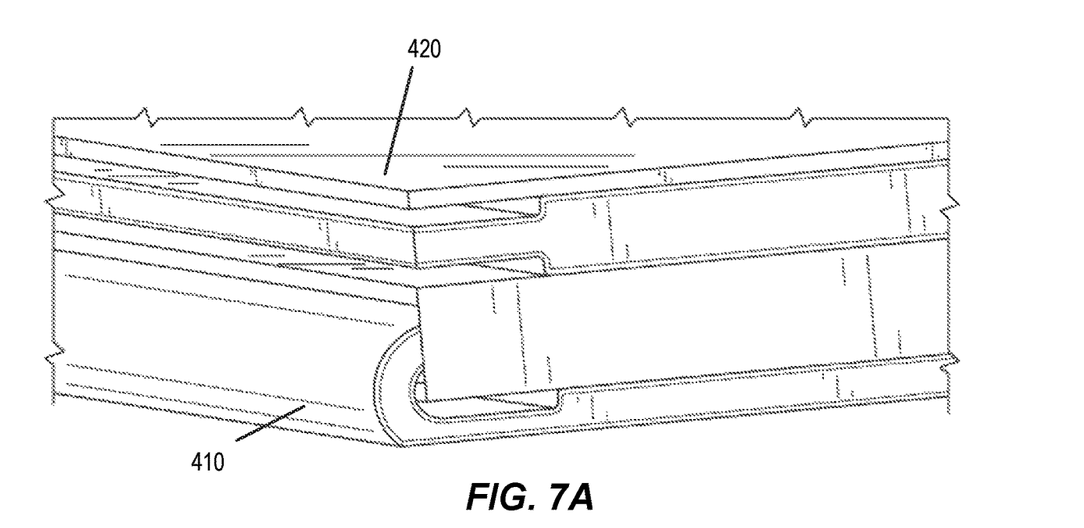
FIGS. 7A-7D are a set of views detailing a sequence of steps in the construction of one or more electrochemical cells and a resultant solid-state battery, in accordance with an embodiment.

FIG. 6 is a flow chart of process 600 for making a secondary electrochemical cell using double z-folded electrode strips as shown and described in association with FIGS. 4, 5, and 7A-7D. Process 600 initiates with a preparation step 610 wherein any necessary or optional setup and preparation steps may be performed. Setup and preparation operations may include, for example, slitting to the proper width and cut to the proper length the anode and cathode strips (one of which may contain the separator layer). Furthermore, a current collector may be exposed over the distance of one cell length via patch coating which may be used to create the bare areas, or via removal of the electrode and separator material from the appropriate area. Once any preparatory operations are completed, process 600 advances to step 620 wherein required coating of material strips, such as material strip 410, is performed as described herein above. Next in step 630, the material strips may be oriented such that the planes of the electrodes are parallel and the long axes of the material strips are perpendicular and then alternatively z-folded. FIG. 7A shows the result of z-folding two layers of a multilayer cell structure with the continuous interleaving of two material strips 410 and 420. It may be observed that the double z-fold electrode weave, results in the long continuous electrodes woven together, minimizing interconnect volume with the separator encapsulated dual sided cathode electrically isolating the anode from the cathode. Folding is repeated, alternating each material strip until the desired electrochemical cell thickness or number of layers is achieved.

Figure 7B:
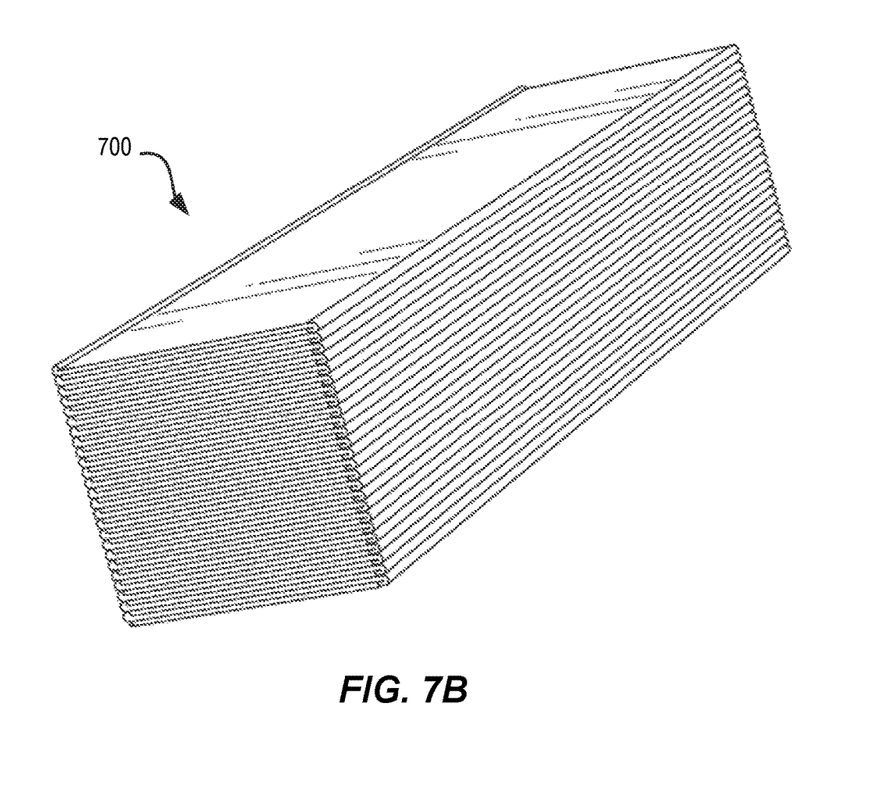
Figure 7C:
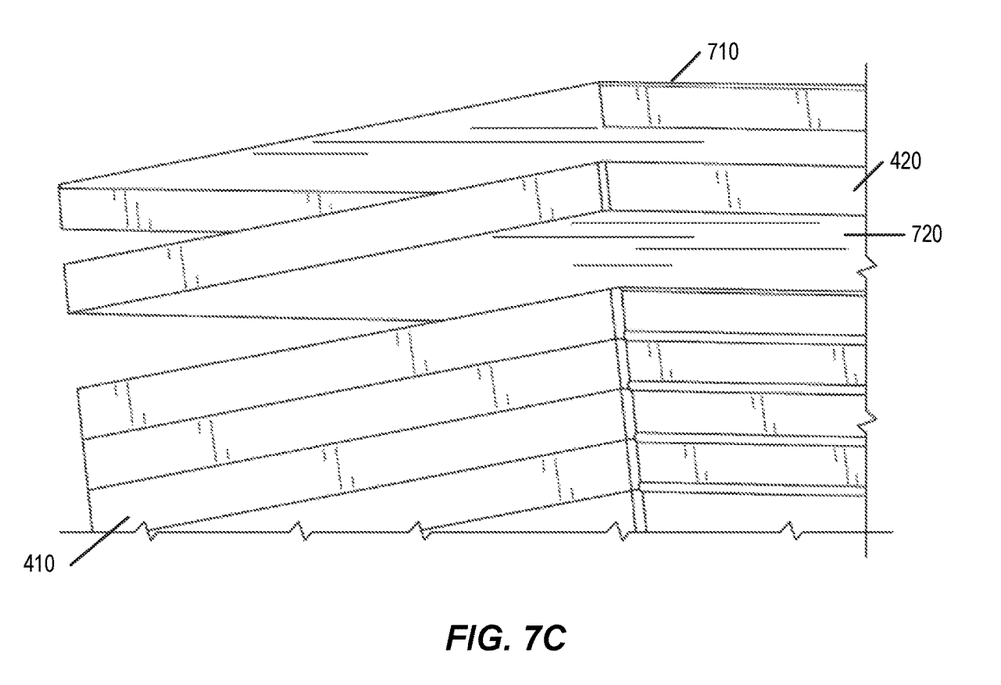
Figure 7D:
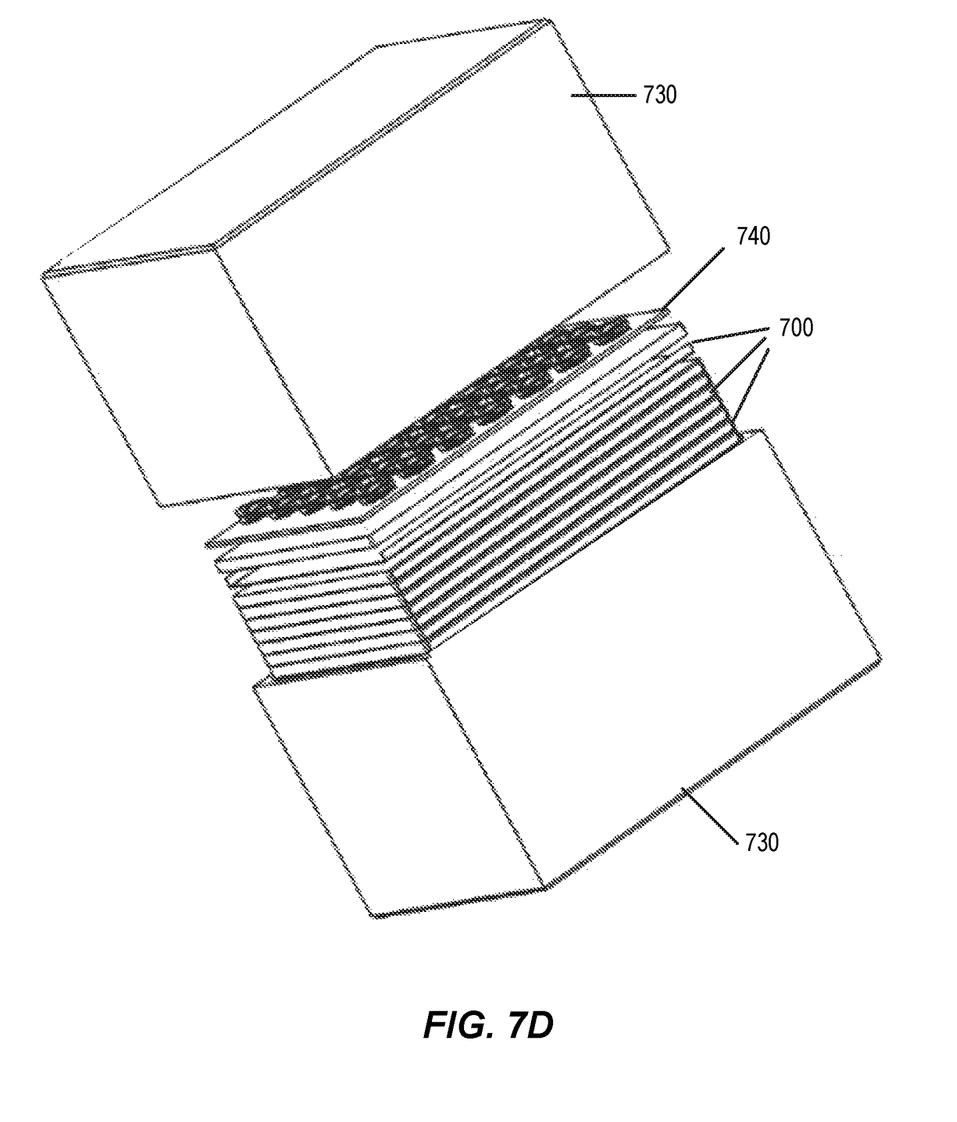

Subsequent to folding operations, the electrochemical cell may be pressed and/or heated to a temperature of 60 to 170 degrees Celsius for up to 300 minutes during step 640. After performing a required number of z-folds to form the desired cell, the structure of cell 700 of the two long continuous interleaved electrodes may appear as shown in FIG. 7B. Following pressing and/or heating the electrochemical cell may be packaged in a step 650. As indicated in FIG. 7C packaging for one or more cells may include the addition of metal backer 710 contacting material layer 410 (e.g., lithium anode) and acting as a current bus. Metal backer 710 may be made from copper, stainless steel or other metals. For electrical interconnection of multiple cells, final folded layers of cathode material strip 410 may be designed, configured or modified to leave aluminum current collector 720 exposed permitting surface to surface electrical contact for stacked cells. In a final step 660, process 600 ends and any further actions may be performed. Further actions may include packaging of one or more individual cells into parallel or serial configurations and evaluation of the electrochemical cell performance. As shown in FIG. 7D, multiple cells may be stacked and enclosed within housing 730 which contains the cells and applies stack pressure such as by spring array 740, or other means. Any and all steps of process 600 may be duplicated, re-ordered and/or modified to suit the specific needs to the exact cell structure and/or materials undergoing processing.

The resultant electrochemical cell maintains electrical contact along the functional faces and requires no tabs for interconnecting layers. This arrangement provides an optimization of the active volume of the electrochemical cell within the packaging and also reduces the weight and complexity of the electrochemical cell since additional connectors and tabs between layers are not required. Electrical isolation between the two electrodes, formed from the material strips, is maintained by an insulating coating on one of the material strips. This coating, such as separator layers 411, prevents shorting but has sufficient ionic conductivity to serve as an electrolyte. Alternatively or optionally to prevent shorting at edges, separator layer, such as layer 411, may be coated onto the electrode layers so that the separator material extends beyond the edge of the electrode, covering the edge. Furthermore the electrode edges may be coated with an additional insulating material layer after the electrode and separator coating layers are applied.

The solid-state electrochemical cell of the described configurations includes two interwoven z-folds, one for the cathode-separator composite, and one for the lithium foil (or other anode material). This construction eliminates the need for tabs and interconnects and maximizes the energy density for prismatic cells. The construction also allows for uniform stack pressure to be applied across the majority of the solid-state cell area. In an exemplary configuration, one surface of the resulting stack is lithium metal or bare anode current collector, and the opposing surface is bare cathode current collector. This configuration of current collectors allows current to leave the cell stack while minimizing the electrical connectors required. Electrical contact is made through physical contact with the top and bottom of the stack, one providing the positive connection and one providing the negative connection. Electrical connection may also be formed at the edges of the folds for both electrodes, which decreases electrical resistance for cells used in higher power applications.

As described herein the present invention also allows for bipolar batteries to be made from solid-state cells in series. A conductive sheet compatible with both electrode layers (e.g. nickel, if necessary to avoid side reactions) is placed between each cell, and any battery voltage can be delivered that is a multiple of the cell individual voltage. This configurability is difficult, if not impossible, in liquid electrolyte cells because the free-flowing liquid will cause shorting as it forms an ionic conduction path between the cells. This is significant advantage of the solid-state electrochemical cell constructed using the techniques of the present invention.

Figure 8A:
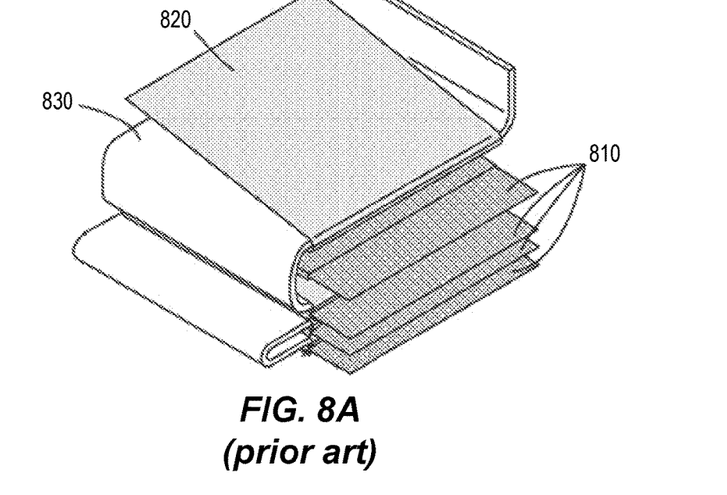
FIGS. 8A and 8B are examples of prior art electrochemical cells shown here for comparison to the present invention.

FIGS. 8A and 8B are examples of the prior art shown here for comparison to the present invention. Various implementations of z-fold processes exist in the prior art for forming elements of electrochemical cells. In one common implementation for producing stacked electrochemical cells, a discreet continuous strip of separator layer is folded, and anode and cathode sheets are alternately placed between each separator layer. More specifically, U.S. Patent Application Publication 2014/0272537 A1 by Kretschmar, et al., included herein by reference, provides details of historical z-folding processes. Certain embodiments described in this application, represented by FIG. 8A, describe electrochemical cells with a one electrode 830 and a separator 820 interleaved in a double z-fold configuration, with the second electrode 810 applied as discrete sheets between the layers of separator 820. This construction is clearly different from the present invention at least in that it entails more complexity and manufacturing steps due to the inserted electrode sheets and independent separator sheet. Furthermore, the constructions of the prior art require electrical tabs on each of these inserted electrode sheets and a way to connect these tabs to an electrical bus. These additional independent layers and contacts are directly integrated when the techniques of the current invention are utilized.

Figure 8B:
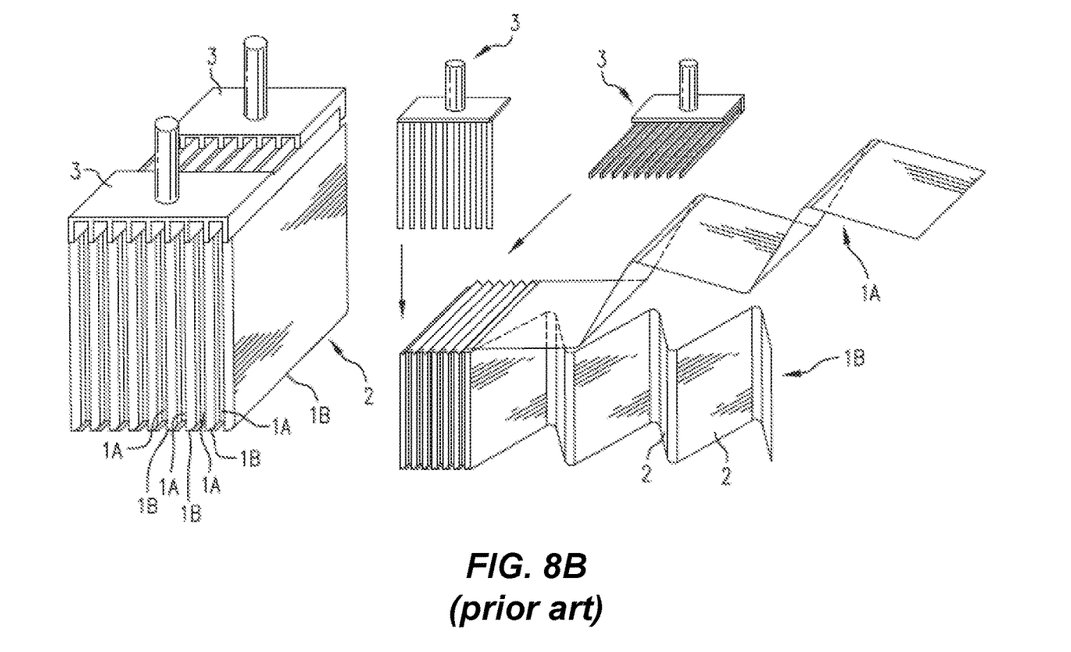

In a further example of existing art, represented by FIG. 8B, the Japanese Patent Application JP H0917441A by Kitaoka Kazuhiro, included herein by reference, describes a configuration that includes two electrodes layers interwoven in a double z-fold with one electrode coated with separator material. Prohibitively, this design relies on comb-like current collectors with one conductor inserted into each fold in order to maintain alignment of the layers and prevent slipping. The described cell also is not all solid-state as it utilizes a liquid electrolyte. These current collectors increase manufacturing complexity and also add undesirable mass and volume to the cell. In contrast, the solid-state design of the present invention allows for lamination of the layers as the stack is being produced or once the stack folding is complete. This can be done through mechanical pressure alone or aided by heat. Polymer electrolytes with adhesive properties may also be used to laminate layers in the electrochemical cells of the present invention.

Features described above as well as those claimed below may be combined in various ways without departing from the scope hereof. The following examples illustrate some possible, non-limiting combinations:

(A1) A solid-state electrochemical cell may include a first electrode substrate with a separator layer, and a second electrode substrate continuously interleaved in an alternating pattern with the first electrode substrate to form an electrochemical cell.

(A2) The electrochemical cell denoted as (A1) may further include an anode layer coated upon one of the first and second electrode substrates.

(A3) The electrochemical cell denoted as (A1) or (A2) may further include a cathode layer coated upon one of the first and second electrode substrates.

(A4) In the electrochemical cell denoted as (A1) through (A3), the first and second electrode substrates may be selected from the group consisting of lithium metal, copper, nickel, stainless steel and aluminum.

(A5) In the electrochemical cell denoted as (A1) through (A4), the separator layer may further include a lithium polysulfide based binder composition.

(A6) In the electrochemical cell denoted as (A1) through (A5), a current bus may be electrically connected to at least one of the first and second electrode substrates.

(A7) In the electrochemical cell denoted as (A1) through (A6), a housing may be provided to contain and apply pressure to the electrochemical cell.

(A8) In the electrochemical cell denoted as (A1) through (A7), the alternating pattern may include the first electrode substrate folded in a z-shape and overlapping alternating folds of the second electrode substrate folded in the z-shape.

(B1) A method of making a solid-state electrochemical cell may include applying a separator layer to a first electrode substrate and continuously interleaving folded portions of the first electrode substrate with alternating folded portions of a second electrode substrate to form an electrochemical cell.

(B2) The method denoted as (B1) may include coating an anode layer upon one of the first and second electrode substrates.

(B3) The method denoted as (B1) or (B2) may include coating a cathode layer upon one of the first and second electrode substrates.

(B4) The method denoted as (B1) through (B3) may include patterning the separator layer to expose at least a portion of the first electrode substrate.

(B5) The method denoted as (B1) through (B4) may include heating the electrochemical cell to a temperature in the range of 60 to 170 degrees.

(B6) In the method denoted as (B1) through (B5), the step of continuously interleaving may include repeatedly folding the first and second electrode substrates to overlap orthogonally with one another to form a z-shaped stack of alternating layers.

(C1) A solid-state electrochemical cell may include a first electrode substrate coated with a first lithium polysulfide based binder composition to form at least one of an anode, a cathode and a separator, a second electrode substrate coated with a second lithium polysulfide based binder composition, and a continuously interleaved stack of the first electrode with the second electrode to form an electrochemical cell having alternating first and second electrode layers.

(C2) In the electrochemical cell denoted as (C1), each of the first and second lithium polysulfide binder compositions may further include a lithium compound, a sulfur compound, and a solvent.

(C3) In the electrochemical cell denoted as (C1) or (C2), the lithium compound may be selected from the group consisting of lithium metal, lithium sulfide and lithium nitride.

(C4) In the electrochemical cell denoted as (C1) through (C3), the solvent may be selected from the group consisting of tetrahydrofuran, dimethyl sulfoxide, γ-butyrolactone, dimethylacetamide, dimethylformamide, dimethyl sulfite, dimethyl sulfoxide, methyl acetate, methyl formate, nitromethane, propylene carbonate, chloro-pentafluoro benzene, methyl THF, thiophene, dimethyl carbonate, pyridine, and sulfolane.

(C5) The electrochemical cell denoted as (C1) through (C3) may include at least one of a co-solvent and a polymer.

(D1) A method of making a solid-state electrochemical cell may include modifying a lithium polysulfide based binder to provide at least one of an anode, a cathode and a separator, applying the modified lithium polysulfide binder to a first electrode substrate, drying the modified lithium polysulfide binder, and forming an electrochemical cell by folding in a z-shaped pattern the first electrode substrate and continuously interleaving the first electrode substrate with a second electrode substrate folded in a z-shaped pattern.

It should thus be noted that the matter contained in the above description or shown in the accompanying drawings should be interpreted as illustrative and not in a limiting sense. The above-described embodiments should be considered as examples of the present invention, rather than as limiting the scope of the various inventions. In addition to the foregoing embodiments of inventions, review of the detailed description and accompanying drawings will show that there are other embodiments of such inventions. Accordingly, many combinations, permutations, variations and modifications of the foregoing embodiments of inventions not set forth explicitly herein will nevertheless fall within the scope of such inventions. The following claims are intended to cover generic and specific features described herein, as well as all statements of the scope of the present method and system, which, as a matter of language, might be said to fall there between.

What is claimed is:

1. A binder composition for processing one or more electrode and/or separator layers in an electrochemical cell comprising a sulfide-based, solid electrolyte, wherein the binder composition comprises a homogeneous mixture of a lithium polysulfide composition and an aprotic solvent, wherein the binder composition comprises a formula $Li_xS_y*z$ (aprotic solvent) and wherein the binder composition is coated or cast as a film onto a substrate comprising an anode, a cathode, and/or a separator layer of the electrochemical cell.

2. The binder composition of claim 1, wherein the aprotic solvent comprises tetrahydrofuran, dimethyl sulfoxide, γ-butyrolactone, dimethylacetamide, dimethylformamide, dimethyl sulfite, methyl acetate, methyl formate, nitromethane, propylene carbonate, chloro-pentafluoro benzene, methyl tetrahydrofuran, thiophene, dimethyl carbonate, pyridine, sulfolane, or mixtures thereof.

3. The binder composition of claim 1, wherein the aprotic solvent is removed or partially removed from the binder composition by heating or air-drying.

4. A slurry composition for use in production of one or more components of an electrochemical cell comprising:
   a binder composition comprising a homogeneous lithium polysulfide composition and an aprotic solvent,
   wherein the binder composition comprises a coating for one or more substrates comprising electrode layers and/or one or more separator layers of the electrochemical cell, and
   wherein the electrochemical cell comprises a sulfide-based solid electrolyte.

5. The slurry composition of claim 4, further comprising one or more of a cathode or anode material, a co-solvent, and a polymer binder.

6. The binder composition of claim 1 wherein the lithium polysulfide composition comprises a mixture of elemental sulfur powder and one or more of lithium metal, lithium sulfide, and lithium nitride.

7. The binder composition of claim 1 comprising a solution form.

8. The binder composition of claim 7 further comprising a polymer.

9. The binder composition of claim 7 wherein the polymer comprises polyvinyl chloride, polyanilene, poly(methyl methacrylate), nitrile butadiene rubber, polyvinylidene fluoride, or polystyrene.

10. The binder composition of claim 1 further comprising a ceramic or glassy powder comprising a metal oxide, a metal phosphate, an electrochemically active metal sulfide; a non-sulfide electrolyte; a carbon-containing solid comprising graphite or carbon black; or a mixture thereof.

11. The binder composition of claim 1 comprising a solid form.

12. The binder composition of claim 1 comprising a slurry form.

13. A solid composition for use as one or more components of an electrochemical cell comprising a homogeneous lithium polysulfide composition having a formula $Li_xS_y*z$ (aprotic solvent).

14. The solid composition of claim 13, wherein the aprotic solvent comprises tetrahydrofuran, dimethyl sulfoxide, γ-butyrolactone, dimethylacetamide, dimethylformamide, dimethyl sulfite, methyl acetate, methyl formate, nitromethane, propylene carbonate, chloro-pentafluoro benzene, methyl tetrahydrofuran, thiophene, dimethyl carbonate, pyridine, sulfolane, or mixtures thereof.

15. The solid composition of claim 13 wherein the lithium polysulfide composition comprises $Li_2S_{10}*2$tetrahydrofuran or $Li_2S_{10}*6$tetrahydrofuran.

16. The binder composition of claim 1 wherein the lithium polysulfide composition comprises $Li_2S_{10}*2$tetrahydrofuran or $Li_2S_{10}*6$tetrahydrofuran.

17. The slurry composition of claim 4 wherein the lithium polysulfide composition comprises $Li_2S_{10}*2$tetrahydrofuran or $Li_2S_{10}*6$tetrahydrofuran.

* * * * *

UNITED STATES PATENT AND TRADEMARK OFFICE
CERTIFICATE OF CORRECTION

PATENT NO. : 11,133,521 B2
APPLICATION NO. : 15/565370
DATED : September 28, 2021
INVENTOR(S) : Heather A. S. Platt, Brandon Kelly and Joshua Buettner-Garrett It is certified that error appears in the above-identified patent and that said Letters Patent is hereby corrected as shown below:

In the Claims

Claim 1, Column 11, Line 15, '$Li_xS_v*z$' should be corrected to -- $Li_xS_y*z$ --

Signed and Sealed this
Fourth Day of April, 2023

Katherine Kelly Vidal
*Director of the United States Patent and Trademark Office*